No. 842,249.　　　　　　　　　　　　　　PATENTED JAN. 29, 1907.
J. O. ROLLINS.
TREE FELLING MACHINE.
APPLICATION FILED JULY 28, 1905.
4 SHEETS—SHEET 4.
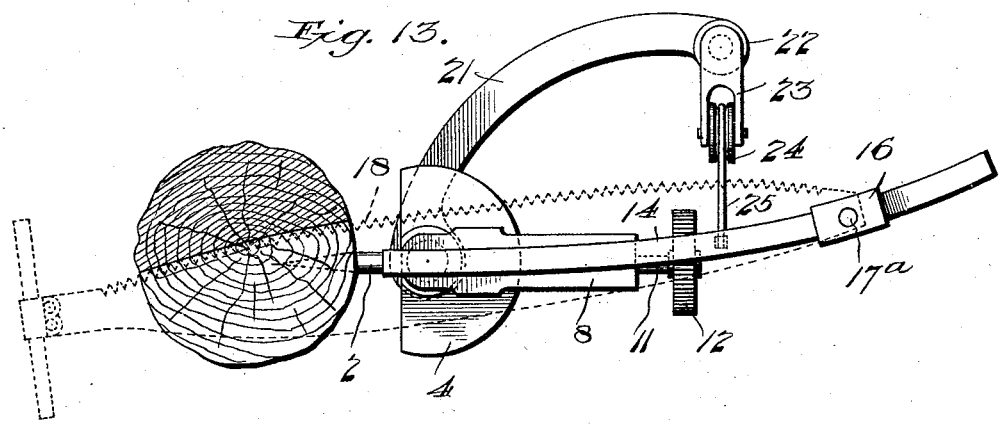
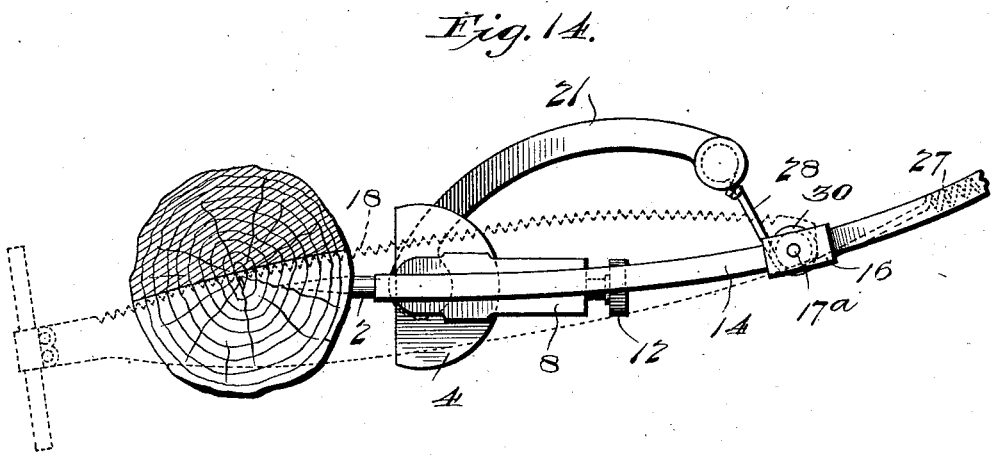
Witnesses　　　　　　　　　　　　　　　Inventor
　　　　　　　　　　　　　　　　　　　J. O. Rollins
　　　　　　　　　　　　　　　By　H. A. Seymour
　　　　　　　　　　　　　　　　　　　　　Attorney

UNITED STATES PATENT OFFICE.

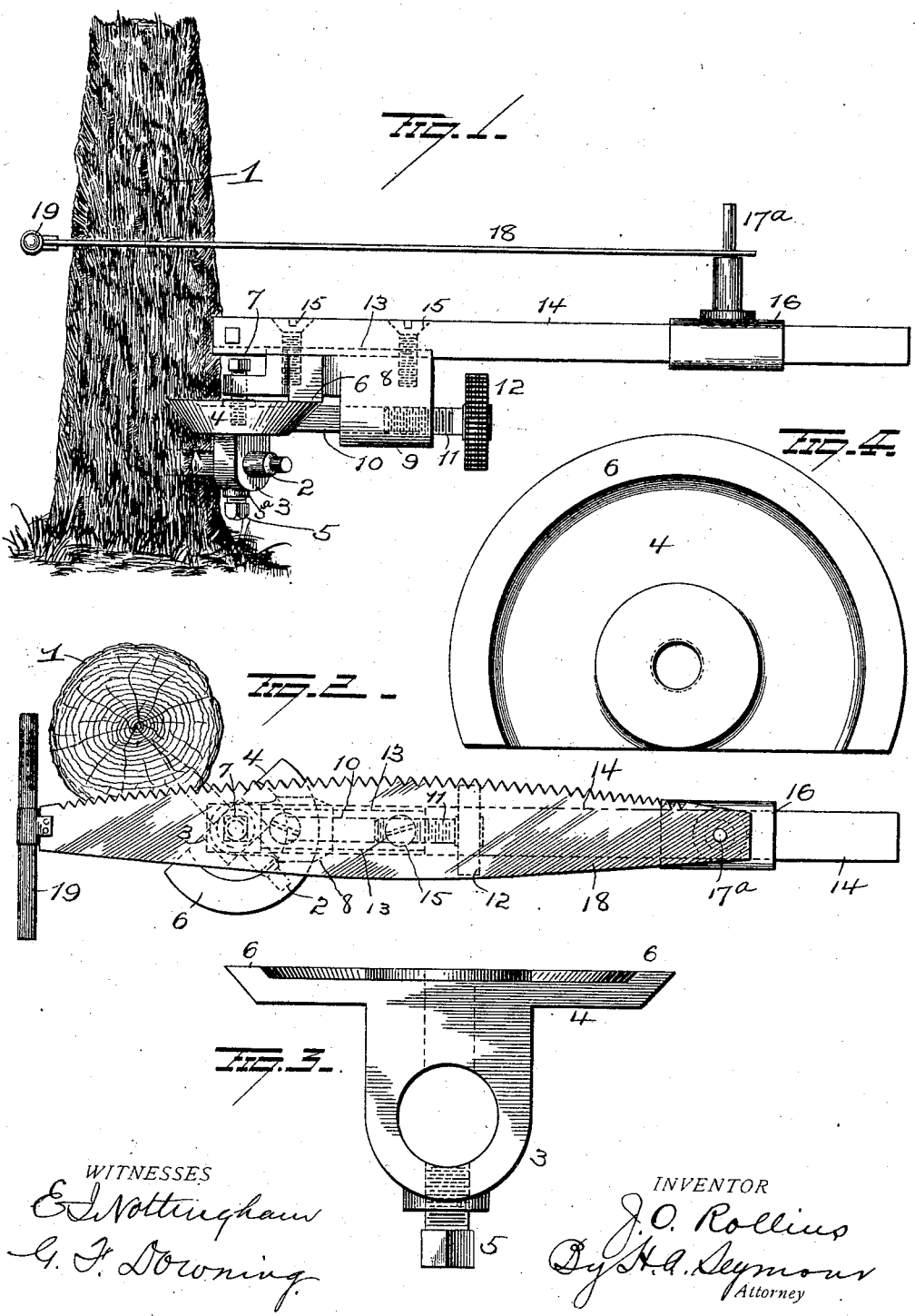

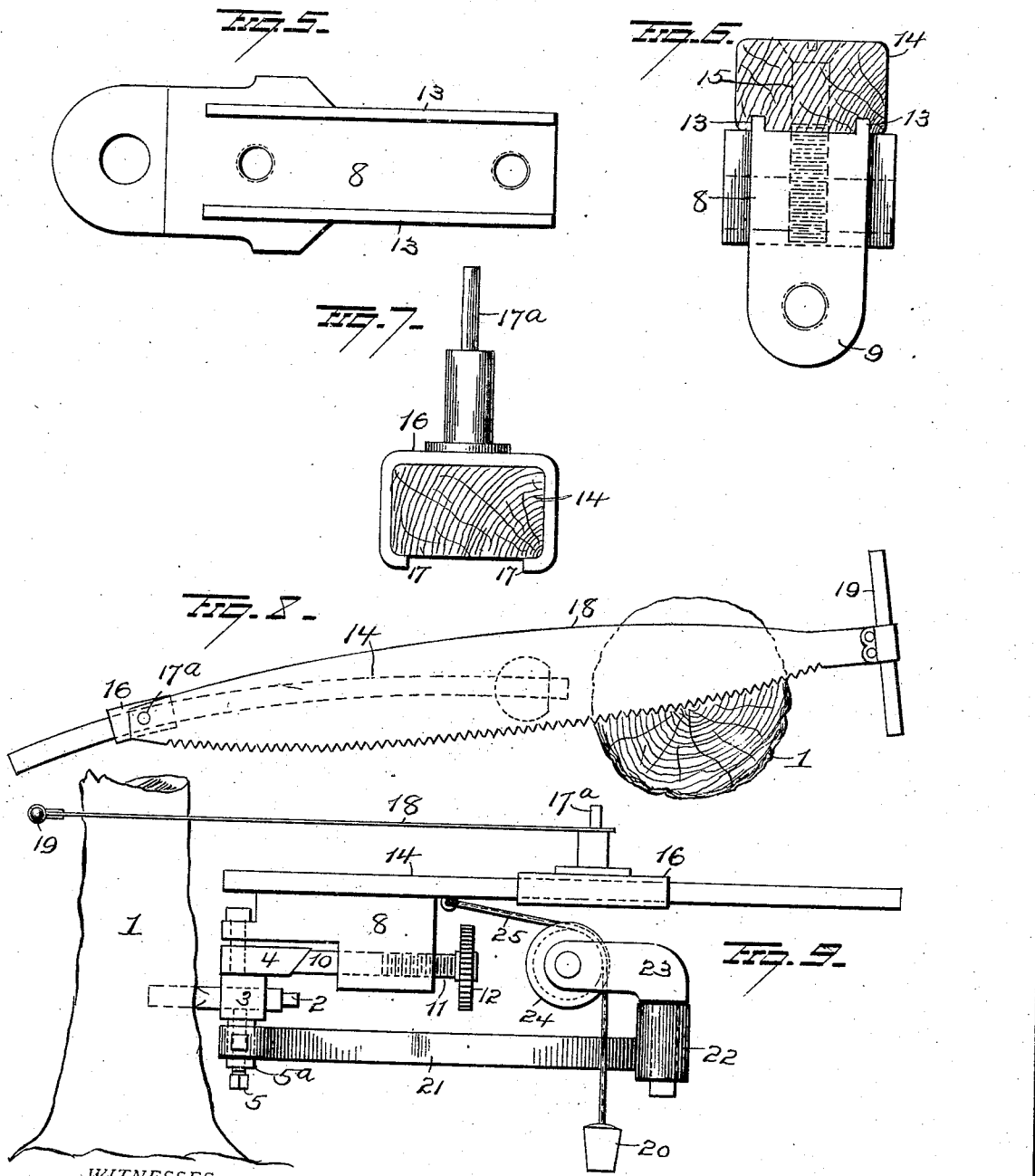

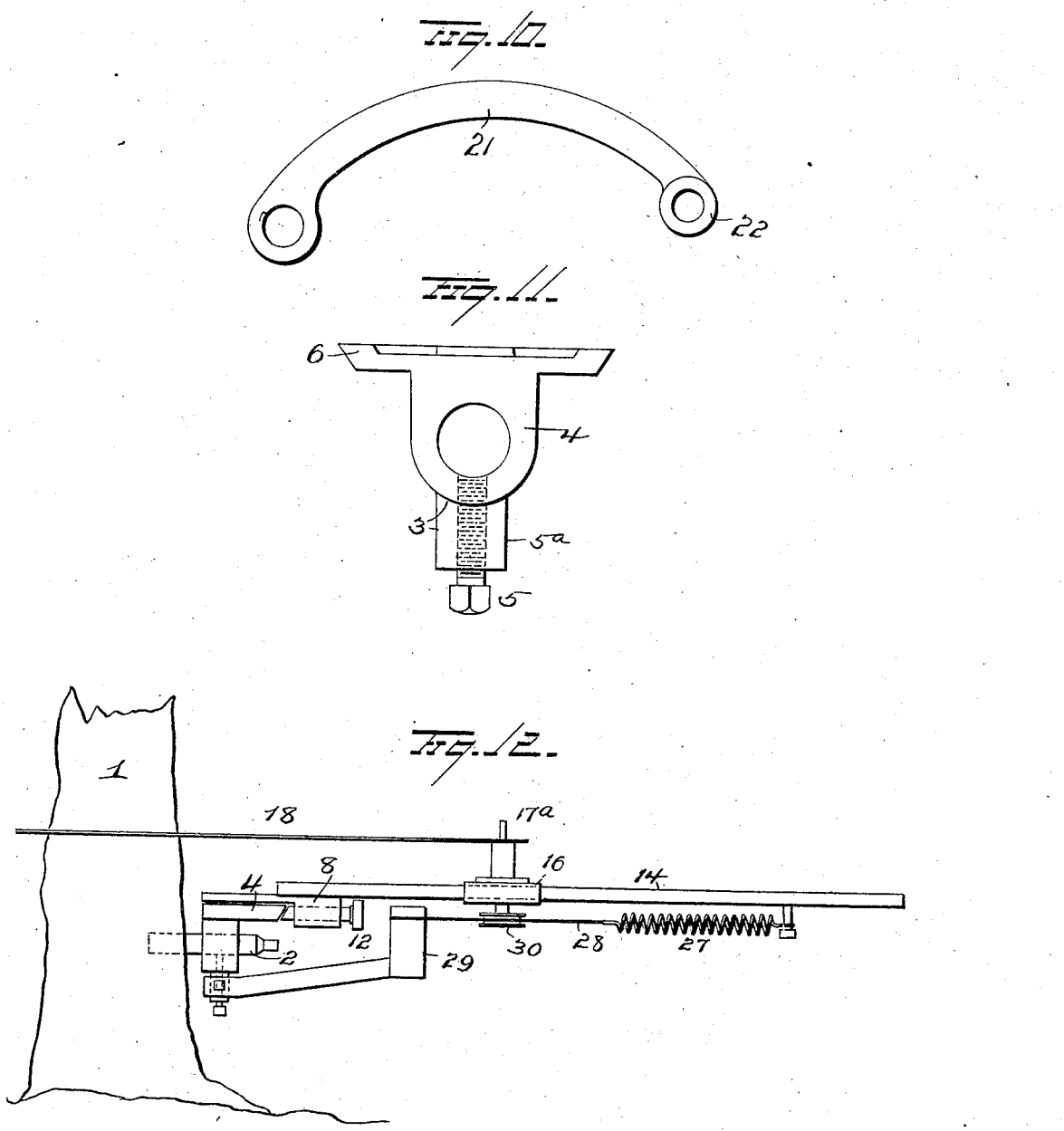

JOHN O. ROLLINS, OF TUOLUMNE, CALIFORNIA.

TREE-FELLING MACHINE.

No. 842,249.  Specification of Letters Patent.  Patented Jan. 29, 1907.

Application filed July 28, 1906. Serial No. 271,664.

*To all whom it may concern:*

Be it known that I, JOHN O. ROLLINS, a resident of Tuolumne, in the county of Tuolumne and State of California, have invented certain new and useful Improvements in Tree-Felling Machines; and I do hereby declare the following to be a full, clear, and exact description of the invention, such as will enable others skilled in the art to which it appertains to make and use the same.

My invention relates to an improved tree-felling machine, the object of the invention being to provide a device of this character which one man can conveniently and easily operate to cut down a tree, dispensing with the necessity of a second man to handle one end of the saw.

A further object is to provide improved means for holding the saw to its work and construct the apparatus in a simple inexpensive manner, resulting in an apparatus which can be easily placed in position on a tree and which will be strong and durable in use.

With these and other objects in view the invention consists in certain novel features of construction and combinations and arrangements of parts, as will be more fully hereinafter described, and pointed out in the claims.

In the accompanying drawings, Figure 1 is a view in side elevation, illustrating my invention. Fig. 2 is a fragmentary plan view. Fig. 3 is an edge view of my improved supporting-bracket. Fig. 4 is a top plan view thereof. Figs. 5, 6, and 7 are detail views. Fig. 8 illustrates my apparatus with a curved saw-guide. Figs. 9 and 12 illustrate the apparatus provided with means for holding the saw to its work, and Figs. 10 and 11 are detail views of the apparatus shown in Fig. 9. Fig. 13 is a plan view of the structure shown in Fig. 9, and Fig. 14 is a plan view of the structure shown in Fig. 12.

1 represents a tree to be cut down and to which my apparatus is applied, as will now be explained.

2 represents a pin or bar having a sharp wedge-shaped end to be driven into the tree, and said pin or bar is made with a cylindrical portion to receive collar 3 on the bottom of my improved bracket 4, and a set-screw 5 is located in a cylindrical lug 5ª on said collar and is adapted to be forced against the pin or bar 2 to securely hold the bracket in position, yet permit it to be tilted, if desired, and secured at any angle.

The bracket 4 is in the form of a platform having the shape of slightly more than a semicircle, with raised flange 6 all around its edge and having its curved edge beveled, as shown. A screw-threaded socket is provided in the center of the bracket to receive a screw 7, having a portion free from threads to serve as a journal for a block 8, through which it is passed. This block has a bearing-sleeve 9 on its lower face, in which a sliding bolt 10 is mounted and provided with a beveled end to engage the beveled edge of bracket 4, and a set-screw 11 is mounted in the outer portion of sleeve 9 and adapted to force the bolt 10 tightly against the bracket to hold the block both perpendicularly and horizontally and at the proper angle of adjustment, and the screw 11 has an enlarged milled finger-hold or button 12 on its outer end to facilitate its adjustment.

The upper face of the block is made with a raised and flanged portion 13 to receive a long guide-bar 14, secured to the block by screws 15, and on this bar 14 is mounted a sliding saw-carrier 16. (Shown most clearly in Fig. 7.) The carrier is of general rectangular shape to receive and slide on the bar and has inwardly-projecting tongues 17 at its lower edge to prevent displacement of the carrier, and it will be seen that owing to the raised and flanged portion of the block this carrier can move the entire length of the bar without obstruction, and hence move up to the tree. On the carrier a vertical pin 17ª is located to receive an opening or hole in one end of a saw 18, the handle 19 of which is to be grasped by the operator, who draws the saw back and forth, and the carrier sliding on its bar guides that end of the saw and dispenses with the necessity for a man at that end. This construction with straight guide-bar is for straight-edge saw, and where a saw with a curved or bowed cutting edge is employed I preferably employ a curved guide-bar, as shown in Fig. 8, and such curved bar compensates for the curvature of the saw edge.

As an additional feature of feeding or holding the saw to its work—that is to say, providing improved means for holding the saw into the cut as the tree is severed—one form of my invention is disclosed in Fig. 9, in which a weight 20 is employed for the purpose. On lug 5ª a sleeve at one end of an arm 21 is secured by a set-screw, and said arm is provided at its other end with a vertical sleeve 22, in which a forked caster 23 is supported. This forked caster carries a pulley 24 to receive a rope 25, connected at one end to the bar 14, and at its lower end said rope carries the weight-receptacle 20, in which the proper weight of material may be placed to properly do the work. By reason of the arm 21 the weight is located at one side and tends to hold the saw against the tree, as the locking dog or bolt 10 is released when the automatic feed is employed.

Fig. 10 discloses a spring 27 for the purpose of automatically holding the saw to its work. In this construction one end of the spring 27 is connected to bar 14, and a rope 28 connects the other end with a fixed arm 29 and is passed around a pulley 30, carried by the saw-carrier guide-bar 14.

In an apparatus of the character described I have found that when using a saw with a curved toothed edge that a curved guide-bar on which to slide the saw-carrier 5 has advantages over the straight bar, as follows: If the saw has a six-inch curve on its toothed edge and a straight guide-bar is used and it is fixed rigidly and not allowed to swing on its pivot, as may be necessary when sawing a stump very close to the ground or in other cases, when the sawer draws the stroke through the tree the saw passing in front of and past him as he stands behind its toothed edge in the usual manner, by the time that the middle of the curved edge has come into the tree the back of the saw or a point at the middle of a straight line drawn through the saw from end to end and representing the line of draft has moved back from the cut six inches, though being carried back by the curved middle part, and since the pivot end of the saw on the saw-carrier has not moved out of the straight line of the saw-guide it follows that the opposite or handle end of the saw has moved out of said line twice as much as the middle has, or twelve inches, which would represent the extra distance that the handle would have to be extended in front of the sawer while drawing the first half of the stroke. Now providing the tree is a small one—twelve inches, for instance—after the middle of the saw has passed through the tree the back of the saw or the line drawn through the saw from end to end, which represents the line of draft, gradually nears the saw-cut until the pivot end reaches the tree. Hence the handle end of the saw takes on a reverse movement after the middle of the saw has passed the tree and passes said guide-line toward the opposite or toothed side of the saw as much as it was forced beyond it in the direction of the back of the saw when the deepest middle part of the saw was in the tree, thus causing the handle end of the saw to execute a compound movement in the stroke covering variations from the line of draft of twenty-four inches.

I overcome the above difficulties by the use of a curved bar, as shown in the drawings. By the use of the curved bar, though the back of the saw at its middle or the said draft-line would recede from the cut six inches, as in the case of the straight bar, the pivot end of the saw has moved back six inches also in the middle of the curved bar, and thus the handle end of the saw would have to move back but six inches during the stroke to keep the saw parallel to the line it was in before it started on its stroke, a straight line through the saw from end to end thus running on parallel lines throughout the stroke, though the varying to and from the cut is six inches as opposed to the twenty-four inches pivot swing of the handle when using the straight bar. Hence the use of the curved bar with the curved saw makes possible a practicable and manageable stroke.

Having fully described my invention, what I claim as new, and desire to secure by Letters Patent, is—

1. In a tree-felling machine, the combination with a bracket having a curved peripheral face and means for securing said bracket to a tree, of a block adjustably supported upon the bracket, means mounted in the block to engage the curved face of the bracket for clamping the block at various positions relatively to the bracket, a bar secured to the block, and a sliding saw-carrier mounted on the bar.

2. In a felling-machine, the combination with a bracket having a curved peripheral face, of a bar pivotally mounted upon the bracket, a locking device supported by the bar to engage the curved face of the bracket and clamp the bar at various positions, a sliding saw-carrier on the bar maintaining the saw parallel to the plane of the swing of the bar, and means connected with said bracket and bar for forcing the latter to one side when the locking device is released.

3. In a tree-felling machine, the combination with a bracket and means for securing the same to a tree, of a bar pivotally mounted upon said bracket and projecting outwardly therefrom, a sliding saw-carrier mounted upon said bar, and means connected with said bar and bracket tending to turn the bar laterally on its pivotal connection with the bracket.

4. In a tree-felling machine, the combination with a support to be driven into a tree, of a bracket on said support having a curved peripheral face, a bar pivotally mounted on the bracket, means carried by the bar to engage the curved peripheral face of the bracket and clamp the bar in various positions, a sliding saw-carrier on the bar and movable throughout the full length thereof and means connected with the bar and bracket exerting lateral pressure on the bar when the clamping means is released.

5. A tree-felling machine, comprising a bracket, means for securing the bracket to a tree, a bar pivotally mounted upon the bracket, means carried by the bar for locking the latter at various positions against pivotal movement, a sliding saw-carrier on the bar, said saw-carrier being movable throughout the full length of the bar, and a pin on the saw-carrier to receive one end of a saw.

6. A tree-felling machine, comprising a saw, a laterally-curved guide-bar, means for attaching the guide-bar to a tree, and a sliding connection between said laterally-curved bar and one end of the saw.

7. A tree-felling machine, comprising a support, means for securing the support to a tree, a laterally-curved bar attached at one end to said support and projecting outwardly therefrom, a carrier mounted to travel from end to end of said laterally-curved bar and a saw attached at one end to said carrier.

8. In a tree-felling machine, the combination of a bracket to be secured to a tree and having a beveled peripheral edge, a block pivotally mounted upon said bracket and provided with a set-screw-locking device to engage the beveled edge of the bracket and clamp the block to the bracket, and a guide-bar secured to the block, all substantially as and for the purpose set forth.

9. A tree-felling machine, comprising a guide-bar, means for supporting the same, a saw-carrier comprising a shell to clasp the guide-bar and movable the length of the latter and a pin on said shell, and a saw pivotally connected with said pin.

In testimony whereof I have signed this specification in the presence of two subscribing witnesses.

JOHN O. ROLLINS.

Witnesses:
E. S. PARKER,
W. L. HOWES.